United States Patent [19]

Onsager

[11] 4,342,904
[45] Aug. 3, 1982

[54] LIGHTWEIGHT FERROMAGNETIC MARKER FOR THE DETECTION OF OBJECTS HAVING MARKERS SECURED THERETO

[75] Inventor: Lloyd W. Onsager, St. Paul, Minn.

[73] Assignee: Minnesota Mining and Manufacturing Company, Saint Paul, Minn.

[21] Appl. No.: 201,177

[22] Filed: Oct. 27, 1980

[51] Int. Cl.³ .............................................. G06K 19/06
[52] U.S. Cl. .................................... 235/493; 340/572; 255/487; 255/488
[58] Field of Search ................ 340/572; 235/493, 487, 235/488

[56] References Cited

U.S. PATENT DOCUMENTS 3,755,803  8/1973  Cole .................................... 340/572
3,820,104  6/1974  Fearon ................................ 340/572
4,021,705  5/1977  Lichtblau ........................... 340/572
4,075,618  2/1978  Monean .............................. 340/572
4,222,517  9/1980  Richardson ........................ 340/572

Primary Examiner—Harold I. Pitts
Attorney, Agent, or Firm—Cruzan Alexander; Donald M. Sell; Randall J. Gort

[57] ABSTRACT

A lightweight marker adapted to be secured to an object for detecting the presence of that object within an applied magnetic field, the marker comprising a strip of ferromagnetic material having a magnetic and physical properties designed to generate a detectable signal whenever an object bearing the strip is placed with the field, cover means for protecting the strip and attaching it to the object, and a low friction release material between the cover means and the strip for affording relative slippage between the cover means and the strip, thus limiting the transfer of any mechanical stress applied on the marker to the strip.

5 Claims, 2 Drawing Figures

LIGHTWEIGHT FERROMAGNETIC MARKER FOR THE DETECTION OF OBJECTS HAVING MARKERS SECURED THERETO

TECHNICAL FIELD

This invention relates to a ferromagnetic marker adapted to be secured to an object for detecting the presence of that object within a defined zone.

BACKGROUND OF THE INVENTION

Theft of inventory or materials from commercial establishments is an ever-increasing problem. Systems attempting to mitigate such theft have been disclosed, with one such system described in U.S. Pat. No. 3,665,449 which issued May 23, 1972, and which is incorporated herein by reference. This system is representative of those known in that a "marker" element is secured to an object which is to be detected, and electrical circuits are included to detect a signal produced by that marker. The particular marker described within the above referenced system comprises a narrow ribbon of a specialized ferromagnetic material such as permalloy, which has a very high permeability (e.g., greater than $10^6$ gauss/oersted), and an aggregate saturation magnetic moment of at least 0.1 electromagnetic units (pole-centimeters). A first-circuit of the system described applies an alternating magnetic field within a defined interrogation zone. This applied field has a predetermined peak magnitude of less than 20 oersteds, and is periodically alternating at a frequency within the audio range. When an object bearing a marker is passed into the applied field and a vector component of that field becomes oriented with a major dimension (for example, length) of the marker, the magnetization of the marker reverses at each alternation of the applied field. Each magnetization reversal within the marker produces a characteristic pulse of external magnetic field. A second circuit of the system detects this pulse, thus verifying the presence, identity, or status of the object.

It is characteristic of the ferromagnetic material utilized within this system that even the slightest mechanical strain applied to the marker tends to cold work the material and degrade its permeability and other magnetic properties (see U.S. Pat. No. 3,665,449, column 6, lines 4 through 12). For this reason, it has been customary to install the marker within a rigid object, or to protect the ferromagnetic material within cover means which reduce the amount of bending or twisting. These cover means, typically molded plastic housings, tend to be bulky and of considerable weight as compared to the ferromagnetic material within. The undesirable weight and bulkiness of such a marker has severely restricted the use of the system with fragile and deformable items like clothing, wherein besides being aesthetically unattractive, a heavy marker hanging thereon could actually stretch the fibers of the garment and affect its saleability. Hence, a lightweight marker is desirable but can be used only if it can still limit mechanical strain from being applied to the ferromagnetic material therein.

DESCRIPTION OF THE INVENTION

The present invention relates to a lightweight ferromagnetic marker adapted to be secured to an object, for detecting the presence of that object within an applied magnetic field, which varies in intensity at a predetermined frequency. This marker comprises a thin strip of ferromagnetic material having a sufficiently low coercivity, a sufficiently high permeability, and a sufficiently large value for the ratio of its length to the square root of its cross sectional area to enable the generation of a detectable signal whenever the object bearing the strip is placed within the field. Cover means are provided in the form of a pair of thin, lightweight sheets of a fairly rigid material which are disposed adjacent the opposing faces of the magnetic strip and fastened together by adhesive means. The marker of the present invention interposes a low-friction release paper between at least one of the cover sheets and one face of the magnetic strip. This release paper affords slippage between the strip and that cover sheet, thus allowing some bending of the assembly without the same transfer of mechanical strain to the ferromagnetic strip. In addition, the marker of the present invention includes a layer of pressure-sensitive adhesive coated foam tape placed adjacent at least one face of the ferromagnetic strip. This foam tape serves to further cushion the ferromagnetic strip from mechanical strain and stresses which might be transferred due to the bending or twisting of the marker.

BRIEF DESCRIPTION OF THE DRAWING

The present invention will be further described hereinafter with reference to the accompanying drawing wherein.

DETAILED DESCRIPTION

Figure 1:
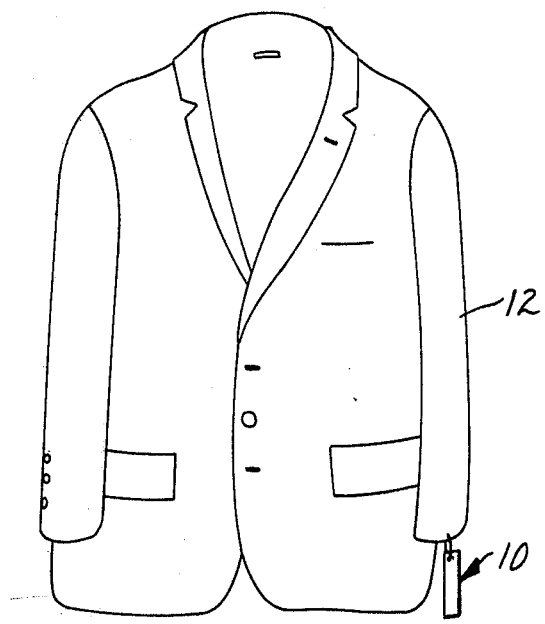
FIG. 1 is a frontal view of an object with a marker according to the present invention attached thereto.

A ferromagnetic marker 10 according to the present invention is illustrated in FIG. 1 as attached to an article of clothing 12. Although not clearly shown, the manner of attachment is usually one which readily prevents the unauthorized removal of the marker 10 from the article of clothing 12. There are various attachment techniques which accomplish this goal, none of which, however, are the subject of this invention.

The attachment of this marker 10 makes it possible to detect the presence of the article of clothing 12 whenever that article 12 is brought within a predetermined interrogation zone in which a magnetic field, having a periodically varying magnitude, has been applied according to the teachings of U.S. Pat. No. 3,665,449, previously incorporated by reference herein.

Figure 2:
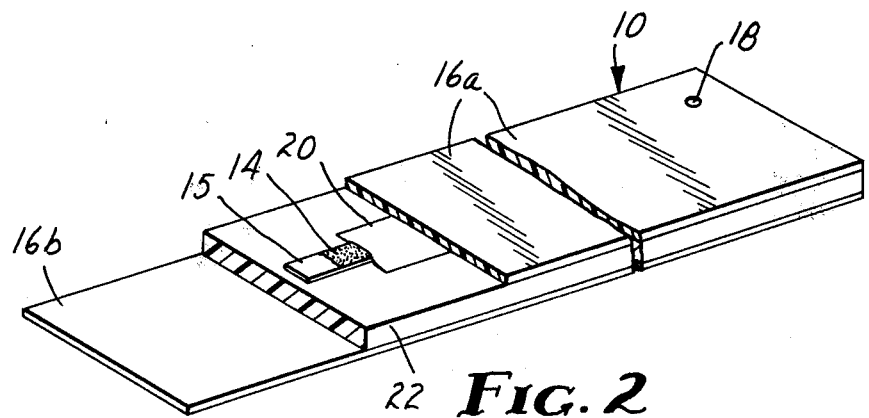
FIG. 2 is an enlarged perspective view of the present invention with parts broken away to reveal the internal construction therein.

The actual construction of the marker 10 is illustrated in FIG. 2 wherein is shown a thin strip of ferromagnetic material 14 between cover sheets 16a and b. The ferromagnetic material 14 is designed to have a sufficiently low coercivity, a sufficiently high permeability, and a sufficiently large value for the ratio of its length to the square root of its cross sectional area to afford the generation of a detectable signal according to the teachings of the patent previously referenced. Typically the material 14 is a strip of permalloy 12.7 cm long, 0.38 cm wide, and 0.25 mm thick. The cover means typically comprise a pair of thin rectangular sheets of vinyl 16a and b, with one of these sheets disposed adjacent each of the opposing faces of the ferromagnetic strip 14, thus partially encompassing the strip 14. The vinyl sheets 16a and b are coated with adhesive affording the attachment of the sheets together with the strip 14 therebetween. The cover means protect the strip 14 without adding considerable weight to the marker 10, as well as afford the attachment of the strip 14 to an object 12. For this latter purpose a hole 18 exists on one end of the cover sheets 16. This hole 18 is used as part of an attachment means (not shown) to attach the marker to the object.

Means are interposed between at least one of the cover sheets 16a and b and the strip 14 for affording slippage therebetween. This means typically comprises a strip (or strips) of silicone coated release paper 20. As the cover sheet 16a or 16b is purchased, it includes such a release paper 20. This combination is commercially available from Flexcon Co. Inc., Spencer, Mass. and is designated by their description 1000 hard white vinyl. When the release paper is in place, limited twisting or bending of the marker 10 is possible with only a limited transfer of mechanical stress to the ferromagnetic strip 14. The full stress is not transferred because of the relative slippage between the cover sheet 16 and the ferromagnetic strip 14 as a result of the limited sliding friction offered by the release liner. The ferromagnetic strip 14, as supplied, is itself typically coated with adhesive and covered with a release liner backing 15. Thus the relative slippage occurs between both faces of the strip 14 and whatever they are contacting.

To further eliminate the transfer of mechanical stress, means are included for cushioning the ferromagnetic strip 14. These means comprise a sheet of elastomeric material 22 coated on both faces with pressure sensitive adhesive, affording the adherance of the material 22 to a face of one of the cover sheets 16a and b, and to one of the release liners 15 or 20. Such an elastomeric material is commercially available in the form of a foam tape (e.g., #4032 polyurethane foam tape as available from 3M Co., St. Paul. Minn.). The release paper 15 disposed between the ferromagnetic strip 14 and the elastomeric material 22 still affords the desired slippage, however the slippage now occurs between the elastomeric material 22 and the liner 15, as well as between the liner 15 and the strip 14.

Because of the weight and size reduction afforded by the replacement of the molded plastic housings with the vinyl cover sheets 16, as well as the limitation of the transferred mechanical stress to the strip 14 because of the release liner 20 and the elastomeric cushion 22, the marker 10 of the present invention will augment the utility of the detection system to areas such as clothing and apparel stores, previously restricted.

Having described a preferred embodiment of the present invention, it will be understood that changes may be made in size, shape, or configuration of some of the parts described herein without departing from the present invention as recited in the appended claims.

What is claimed is:

1. A lightweight ferromagnetic marker adapted to be secured to an object for detecting the presence of that object within an applied magnetic field varying in intensity as a predetermined frequency, said marker comprising:

a thin strip of ferromagnetic material having a sufficiently low coercivity, a sufficiently high permeability, and a sufficiently large value for the ratio of its length to the square root of its cross-sectional area to afford the generation of a detectable signal whenever said object, bearing said strip, is placed within said field, cover means for protecting said strip without adding considerable weight to the marker and for affording the attachment of said strip to the object, means interposed between said cover means and at least one face of said strip for affording slippage between said strip and said cover means, thereby limiting the transfer to said strip of mechanical stress applied to said cover means, said slippage means comprising at least one sheet of a low-friction release material.

2. A marker as claimed in claim 1 wherein said cover means comprises a pair of thin rectangular sheets of vinyl, with one of said sheets disposed adjacent each of the opposing faces of said strip, and adhesive means on said vinyl sheets for attaching said sheets together.

3. A marker as claimed in claim 1 wherein said means for affording slippage comprises a sheet of silicone coated release paper adjacent at least one face of said strip and interposed between said strip and said cover means.

4. A marker as claimed in claim 1 further comprising means adjacent at least one face of said strip for cushioning said strip from mechanical stresses which might be applied through bending or twisting said marker.

5. A marker as claimed in claim 4 wherein said cushioning means comprise a sheet of elastomeric material coated on both faces with pressure-sensitive adhesive which adheres to said face of said strip.

* * * * *